Patented Nov. 15, 1949

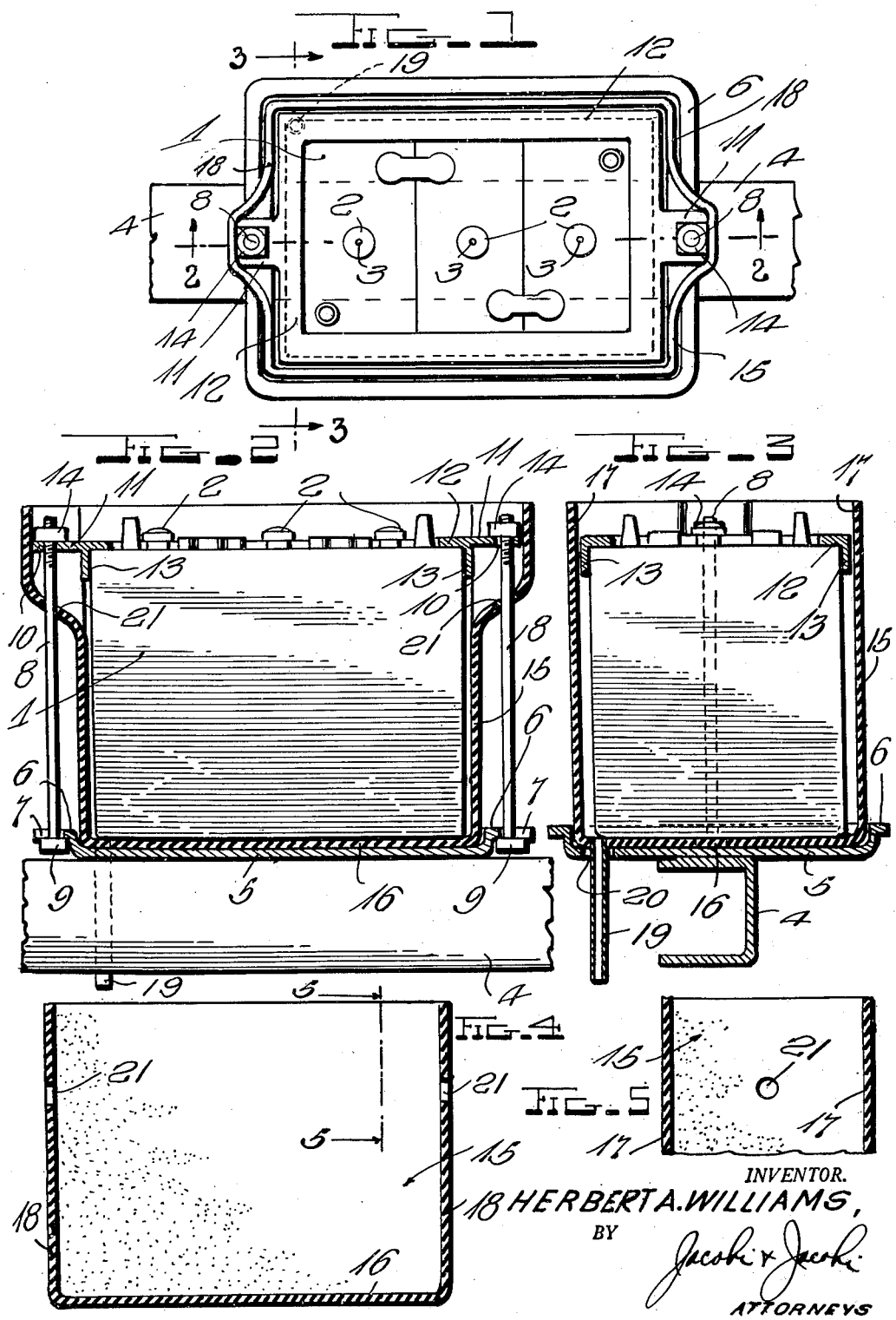

2,488,360

UNITED STATES PATENT OFFICE 2,488,360

BATTERY CASING

Herbert A. Williams, Goldsboro, N. C.

Application June 23, 1948, Serial No. 34,638

2 Claims. (Cl. 180—68.5)

1

This invention relates to a battery casing and it is one object of the invention to provide a casing which is adapted to be applied about a storage battery and serve as a shield for catching acid which may be spilled from the battery to prevent acid from flowing on or contacting with wires and other elements that may be located under the battery.

When acid overflows from a battery it runs downwardly along side or end walls of the battery and onto a metal bar serving as a support for the battery and corrodes the bar so that it is weakened.

Therefore, another object of the invention is to provide a casing which has a drain pipe leading from its bottom and is of such length that it will extend downwardly beyond the metal bar upon which the battery is mounted.

Another object of the invention is to provide a casing which is formed of soft rubber, or other suitable material and may have portions of its end walls extended outwardly to fit about ears through which bolts are passed to draw a clamping frame downwardly into gripping contact with the top of the battery, said bolts being passed upwardly through openings in a tray in outwardly spaced relation to end walls of the casing and through openings in portions of the casing under the ears so that the nuts of the bolts may be tightened to draw the clamping frame downwardly without causing crumpling or displacing of the casing.

Another object of the invention is to provide a casing which may be very easily applied to a battery and which may be manufactured at low cost.

The invention is illustrated in the accompanying drawings wherein:

Figure 1 is a top plan view of a mounted battery having the improved casing applied to it.

Figure 2 is a vertical sectional view taken longitudinally of the battery along the line 2—2 of Figure 1.

Figure 3 is a transverse sectional view taken along the line 3—3 of Figure 1.

Figure 4 is a vertical sectional view taken longitudinally through the casing before it is applied to a battery.

Figure 5 is a fragmentary sectional view taken through the casing along the line 5—5 of Figure 4.

The battery 1 is of conventional construction and is provided with the usual caps 2 formed with openings 3 through which gas may escape from cells of the battery and through which water and acid will escape due to jolting of the battery

2 or expansion. The battery, when installed in a motor vehicle, is supported by a bar or frame 4 formed of angle metal and rests upon a tray 5 which is welded to the bar and has a marginal wall provided with an outstanding flange 6. At opposite ends of the tray the flange is formed with slots or openings 7 to receive bolts 8 which extend vertically and have their lower ends formed with heads 9 for engaging the under face of the flange. The bolts extend vertically in spaced relation to ends of the battery and their threaded upper ends pass through openings 10 formed in ears 11 which project from opposite ends of a clamping frame 12. This frame fits snugly about the upper portion of the battery and is formed with depending flanges 13 which prevent the frame from moving longitudinally or transversely out of place upon the battery. When the nuts 14 screwed upon upper ends of the bolts are tightened the frame will be drawn downwardly into gripping engagement with the battery and firmly clamp the battery upon the tray 5.

When acid escapes from the battery through the openings 3, 3 in the caps 2 it will run downwardly along sides or ends of the battery and when sufficient acid has escaped it will overflow from the tray 5 and onto the bar 4 and form corrosion which will weaken the bar. In order to prevent this acid from reaching the tray and the bar I have provided a casing 15. This casing is formed of soft rubber, or other suitable material, and has a bottom 16, side walls 17, and end walls 18. The dimensions of the casing are such that it may be easily slipped upwardly into place about the battery with the bottom of the battery resting upon the bottom of the casing and walls of the casing spaced slightly from walls of the battery. Since the walls of the casing are spaced slightly from the battery, acid which escapes from the battery may flow downwardly along the sides and ends of the battery to the bottom of the casing and then flow along the bottom of the casing towards one end thereof and out through a drain pipe 19 which extends downwardly from a corner portion of the casing. This drain pipe passes through an opening 20 formed in the tray and is of such length that it extends downwardly beyond the frame or supporting bar 4, as shown in Figures 2 and 3, and from an inspection of these figures it will be seen that acid flowing from the drain pipe will escape therefrom below the bar and drip upon the ground instead of upon the bar. Openings 21 are formed in end walls of the casing and when portions of the end walls midway the width of the casing are flexed outwardly to an extended position in which they fit about the ears 11 the openings 21 will be disposed directly under the openings 10 and the bolts 8 may be passed vertically through the aligned openings and the nuts then tightened to draw the clamping frame downwardly into tight gripping engagement with the battery. When the battery becomes worn out the casing may be removed and transferred to another battery.

From the foregoing description of the construction of my improved device, the operation thereof and the method of assembly will be readily understood, and it will be seen that I have provided a comparatively simple, inexpensive and efficient means for carrying out the various objects of the invention.

While I have particularly described the elements best adapted to perform the functions set forth, it is apparent that various changes in form, proportion and in the minor details of construction may be resorted to, without departing from the spirit or sacrificing any of the principles of the invention.

Having thus described the invention, what is claimed is:

1. A battery support including a tray having an outstanding flange formed with openings at opposite ends of the tray, a clamping frame for resting upon the top of a battery about marginal portions thereof and provided at opposite ends with outstanding ears formed with openings, bolts passing vertically through the openings of the tray and the ears of the clamping frame and having nuts at their upper ends engaging the ears and forcing the frame downwardly into gripping engagement with the battery when tightened, a shield of soft and pliable acid-proof material open at its top and having a bottom and flat side walls and end walls, said shield fitting snugly about the battery with the bottom of the battery resting upon the bottom of the shield and the walls of the shield spaced slightly from the walls of the battery, said end walls of the shield having upper portions midway their width flexed outwardly about the ears of the clamping frame and formed with openings disposed under the ears and through which the bolts pass, and a drain pipe extending downwardly from a corner portion of the bottom of the shield and through an opening in the corresponding corner portion of the tray.

2. A battery casing formed of soft acid-proof material and being open at its top and having a bottom and side walls and end walls, said casing being of dimensions adapting it to be fitted about a battery with the bottom of the battery resting upon the bottom of the casing and walls of the casing spaced slightly from walls of the battery, end walls of the casing being adapted to have their upper portions flexed outwardly in downwardly spaced relation to their upper ends and being formed with fastener-receiving openings located midway their width, and a drain tube extending downwardly from a corner portion of the bottom of the casing.

HERBERT A. WILLIAMS.

REFERENCES CITED

The following references are of record in the file of this patent:

UNITED STATES PATENTS

| Number | Name | Date |
|---|---|---|
| 684,699 | Lloyd | Oct. 15, 1901 |
| 819,765 | Kiel | May 8, 1906 |
| 2,067,263 | Dick | Jan. 12, 1937 |
| 2,104,769 | Saunders | Jan. 11, 1938 |
| 2,109,316 | Harley | Feb. 22, 1938 |